United States Patent [19]

Rogers

[11] 4,199,217
[45] Apr. 22, 1980

[54] INFRA-RED OPTICAL SYSTEMS

[75] Inventor: Philip J. Rogers, Clwyd, Wales

[73] Assignee: Pilkington P. E. Limited, St. Helens, England

[21] Appl. No.: 906,439

[22] Filed: May 17, 1978

[51] Int. Cl.² .............. G02B 25/00; G02B 15/04; G02B 15/10; G02B 27/17

[52] U.S. Cl. ................. 350/1.2; 350/1.3; 350/1.4; 350/38; 350/175 E; 350/183; 350/189; 350/212; 350/6.1

[58] Field of Search ............ 350/1.2, 1.3, 1.4, 38, 350/175 E, 183, 212, 189

[56] References Cited

U.S. PATENT DOCUMENTS

| 1,553,211 | 9/1925 | Barr et al. ............ 350/183 |
| 3,947,084 | 3/1976 | Noyes ................. 350/1.3 |
| 4,106,845 | 8/1978 | Moore et al. .......... 350/6.8 |

FOREIGN PATENT DOCUMENTS 1532096  11/1978  United Kingdom ............ 350/1.3

*Primary Examiner*—Paul A. Sacher
*Attorney, Agent, or Firm*—Mattern, Ware, Davis & Stoltz

[57] ABSTRACT

The "eye-piece" for a non-Gallilean afocal infra-red telescope comprises a front element which is meniscus with a convex back surface of greater radius of curvature than its concave front surface but which has a thickness such that it is of positive power, and a back element of positive power with a convex front surface and a convex or concave back surface. Such an "eye-piece" can be used in combination with a variety of objective lens systems.

18 Claims, 7 Drawing Figures

INFRA-RED OPTICAL SYSTEMS

BACKGROUND OF THE INVENTION

This invention concerns improvements in or relating to infra-red optical systems and relates more particularly to afocal optical systems for use at infra-red wavelengths.

Afocal optical systems, i.e. systems having an infinite focal length and therefore no apparent focussing action, are well known per se and are used in several applications. The present invention relates to such a system which can be used, in particular, in circumstances where it is required that a beam of infra-red radiation from a distant source and incident on the optical system be reduced in diameter. Such reduction of beam diameter enables a comparatively small, high speed reflective scanning system to be employed in order to provide the requisite scanning of the field of view across an imaging lens plus line detector array.

An optical scanning head of constant angular motion has to operate in a collimated radiation section in order to maintain focus across the field of view and minimise image distortion. An essential in order to prevent vignetting is that the exit pupil of the afocal system should be coincident with the operative facet of the scanning head, i.e. its in-action reflective facet. In order to give a good field of view in the real world and also to minimise the number of facets on the scanning head a wide field of view is required in the image space of the afocal system. The afocal optical system must, therefore, be capable of providing a wide image space field angle at an external exit pupil that is situated a convenient distance after the last optical element of the system.

Further, the space in which the afocal system is to be fitted is usually very limited, and this introduces a requirement for a compact length. Also, the image quality given by the afocal system should be close to the limit set by diffraction as this quality is not particularly high because of the long wavelength of the infra-red radiation.

The present invention is concerned with non-Gallilean afocal infra-red optical systems (sometimes referred to for convenience as telescopes) and provides a family of such systems which can be of compact length and give diffraction-limited imagery over a wide field of view at a position appropriate to the operation of a scanner. A non-Gallilean afocal telescope resembles a conventional telescope in that an objective lens system provides a real image of the infra-red source which is then viewed by an "eye-piece" system. The latter provides a collimated magnified view of the source viewable at a real exit pupil external to the telescope system. It will be understood that the term "eye-piece" is used in this context although the ultimate image is not viewed by the human eye but is, for example, scanned across a detector array, and the term is to be construed accordingly.

SUMMARY

According to the present invention there is provided an "eye-piece" system for use in a non-Gallilean afocal infra-red optical system, the "eye-piece" system comprising two lens elements, the back element of the two being positive in power and having a back surface which is either convex or concave and a front surface which is convex, and the front element of the two being of meniscus form having a back surface which is convex and a front surface which is concave with the radius of curvature of the convex back surface greater than that of the concave front surface but the thickness of the front element being such as to give it positive power.

Such "eye-piece" system functions as a wide angle Petzval lens. Correction of astigmatism can be achieved at the back surface of the front element. The front surface of the front element can function both to correct field curvature and also as a field lens surface by situating it close to the image provided by an objective lens system with which the "eye-piece" system is associated. Such field lens surface enables the size of the objective lens to be kept to a diameter only slightly larger than that necessary to transmit the full axial beam without significant vignetting of the off-axis beams. The objective lens system will normally include a vignetting stop to adequately define an approximately circular exit pupil at a required position for all points in the field of view. Although spherical aberration and coma may not be fully corrected in the "eye-piece" system, they can be compensated for in the design of the objective lens system.

The "eye-piece" system may be designed to cover the thermal 8 to 13 micron waveband or the 3 to 5.5 micron waveband. Preferably the two elements are of the same material, which may conveniently be Germanium for the 8 to 13 micron bandwidth or Silicon for the 3 to 5.5 micron bandwidth.

The thickness of the front element in the "eye-piece" system, which is such as to render the element positive in power in spite of the greater radius of curvature of its back convex surface than that of its front concave surface, is essentially greater than that necessary for mechanical stability. This thickness is preferably between 0.35 and 0.45 of the absolute value of radius of curvature of the element's back surface but may be made greater to the detriment of transmission, or may be made less, for example about 0.30, with a low exit field of view.

Typically an "eye-piece" system in accordance with the invention may provide diffraction-limited imagery at an external exit pupil of about 10 mm diameter over a wide angle of about 60 degrees. Where a much larger exit pupil is required an extra negative power lens element meniscus in shape with a concave back surface may be included between the two elements and close to the back element to improve correction of spherical aberration in a manner well known per se.

The invention further provides a non-Gallilean afocal infra-red optical system comprising an "eye-piece" system as set forth above in combination with an objective lens system. There are a variety of objective lens systems with which the "eye-piece" system can be used to give different types of telescope of which the following are examples:

(a) High magnification achromatised infra-red telescopes, (b) Lower magnification non-achromatised infra-red simple telescopes possibly employing one simple conic aspheric, (c) Continuous zoom infra-red telescopes, (d) Two position infra-red telescopes switchable between high and low magnifications by the substitution of some internal optical elements, (e) Composite infra-red systems containing at least two telescopes one of which may be a zoom or switchable system and where derotation optics (e.g. for nullifying the image rotating effect of a panoramic scanning mirror placed in front of the optical system) are situated in the collimated radiation section between two of the telescopes.

The invention yet further provides an infra-red optical system comprising an objective lens system for producing a real image from infra-red radiation from a distant scene or object, an "eye-piece" system as set forth above positioned to receive infra-red radiation from that image and to provide a collimated magnified view of the scene or object at a real exit pupil, and scanning means operative at that exit pupil to scan the collimated magnified view via imaging means across infra-red detector means.

BRIEF DESCRIPTION OF THE DRAWINGS

Infra-red optical systems in accordance with the invention will now be described, by way of example, with reference to the accompanying drawings, in which.

DESCRIPTION OF THE PREFERRED EMBODIMENTS

Figure 1:
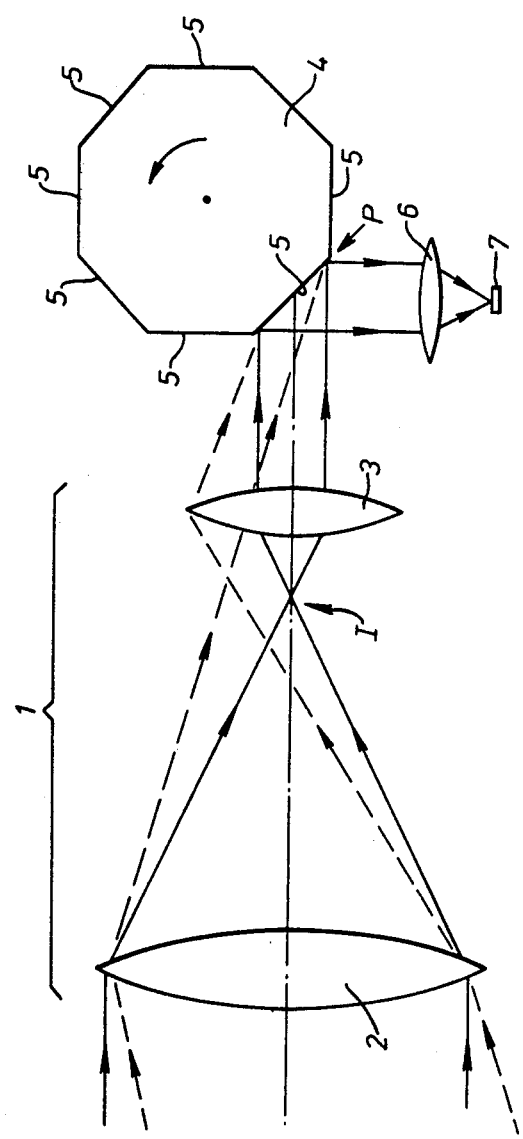
FIG. 1 is a schematic representation of an embodiment of infra-red optical system.

FIG. 1 schematically represents a non-Gallilean afocal infra-red optical system or telescope indicated generally by the reference 1 and comprising an objective lens system 2 and an "eye-piece" lens system 3. The objective lens 2 receives infra-red radiation from a distant scene or object and focusses it to form a real image at position I. The "eye-piece" lens 3 "views" the image I and provides a collimated magnified view of the scene or object viewable at a real exit pupil at a position P external to the telescope system. It will be seen that the effect is to reduce the diameter of a collimated beam of infra-red radiation incident on the telescope.

An optical scanning head 4 having a plurality of reflective facets 5 is rotated at constant angular velocity about a fixed axis orthogonal to the plane of FIG. 1. The head 4 is positioned so that the operational or in-action facet 5 is situated coincident with the exit pupil P. As the head rotates the facet scans the collimated radiation via an imaging lens 6 across an infra-red detector array 7, successive scans being effected by successive facets passing through the exit pupil position.

Figure 2:
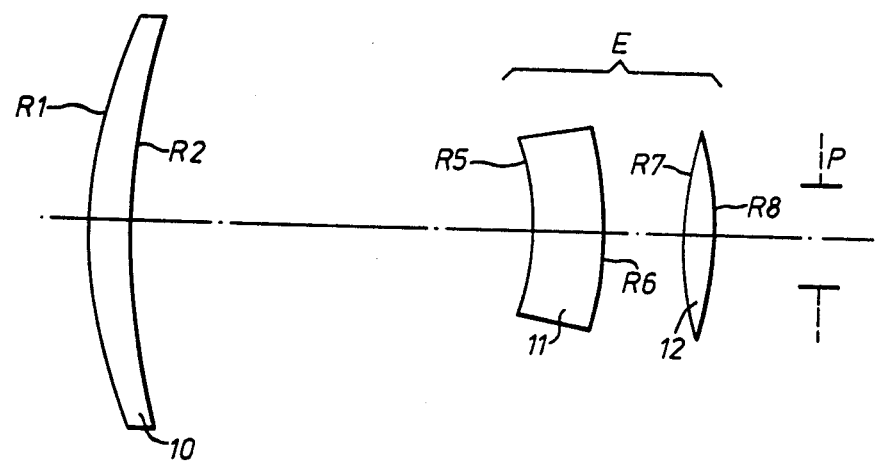
FIG. 2 is a schematic representation of a low or medium magnification non-Gallilean afocal infra-red telescope for use in the system of FIG. 1, FIGS. 3, 5 and 6 are schematic representations of dual magnification non-Gallilean afocal infra-red telescopes for use in the system of FIG. 1.

FIG. 2 illustrates one embodiment of afocal telescope 1. It comprises a front positive objective lens element 10 (corresponding to 2 in FIG. 1) having a front convex surface R1 and a back concave surface R2 of aspheric conic section. Behind the objective element 10 is an "eye-piece" system E (corresponding to 3 in FIG. 1) consisting of two elements 11 and 12. The front element 11 of the two has a concave front surface R5 and a convex back surface R6, the radius of curvature of the back convex surface R6 being greater than that of the front concave surface R5. The axial thickness "d5" of the element 11 is such that the element has positive power in spite of this radius of curvature relationship.

Thus, the thickness is greater than that necessary for mechanical stability and preferably the ratio d5/R6 lies between −0.35 and −0.45. The back element 12 is of positive power having a front convex surface R7 and a back convex surface R8.

Particular examples of afocal telescopes in accordance with the FIG. 2 embodiment have numerical data as given below under Examples 1 and 2. Both these examples are designed to operate over the 8 to 13 micron spectral bandwidth, the three lens elements 10, 11 and 12 all being made of Germanium. Example 1 is a low magnification (×4) system while Example 2 is a medium magnification (×7) system.

EXAMPLE 1

| Element | Surface | Radius of Curvature | Axial Thickness/Separation |
|---------|---------|---------------------|----------------------------|
| 10      | R1      | +96.8552            |                            |
|         |         |                     | 4.826                      |
|         | R2      | +137.620 (aspheric) |                            |
|         |         |                     | 100.910                    |
| 11      | R5      | −24.8452            |                            |
|         |         |                     | d5 = 13.328                |
|         | R6      | −31.5121            |                            |
|         |         |                     | 24.425                     |
| 12      | R7      | +154.940            |                            |
|         |         |                     | 4.237                      |
|         | R8      | −523.998            |                            |

Diameter of element 10 = 40.0
Aperture stop: On R1
Ratio d5/R6 = −0.423
R2 is a conic section, $\epsilon$ = +1.4545
Overall length = 147.75
Maximum angular distortion 0.4%.

EXAMPLE 2

| Element | Surface | Radius of Curvature | Axial Thickness/Separation |
|---------|---------|---------------------|----------------------------|
| 10      | R1      | +158.899            |                            |
|         |         |                     | 170.229                    |
|         | R2      | +220.147 (aspheric) |                            |
| 11      | R5      | −24.4958            |                            |
|         |         |                     | d5 = 11.517                |
|         | R6      | −30.6295            |                            |
|         |         |                     | 24.478                     |
| 12      | R7      | +135.115            |                            |
|         |         |                     | 4.025                      |
|         | R8      | −555.493            |                            |

Diameter of element 10 = 70.0
Aperture stop: On R1
Ratio d5/R6 = −0.376
R2 is a conic section, $\epsilon$ = +1.28
Overall length = 218.33
Maximum angular distortion 0.9%.

In Examples 1 and 2 the value of "$\epsilon$" in respect of the conic section of surface R2 is defined by the equation:

$$X = \frac{CS^2}{1 + \sqrt{1 - \epsilon C^2 S^2}}$$

where
C = curvature
$S^2 = Y^2 + Z^2$
X, Y and Z representing co-ordinates with respect to mutually orthogonal axes.

Figure 3:
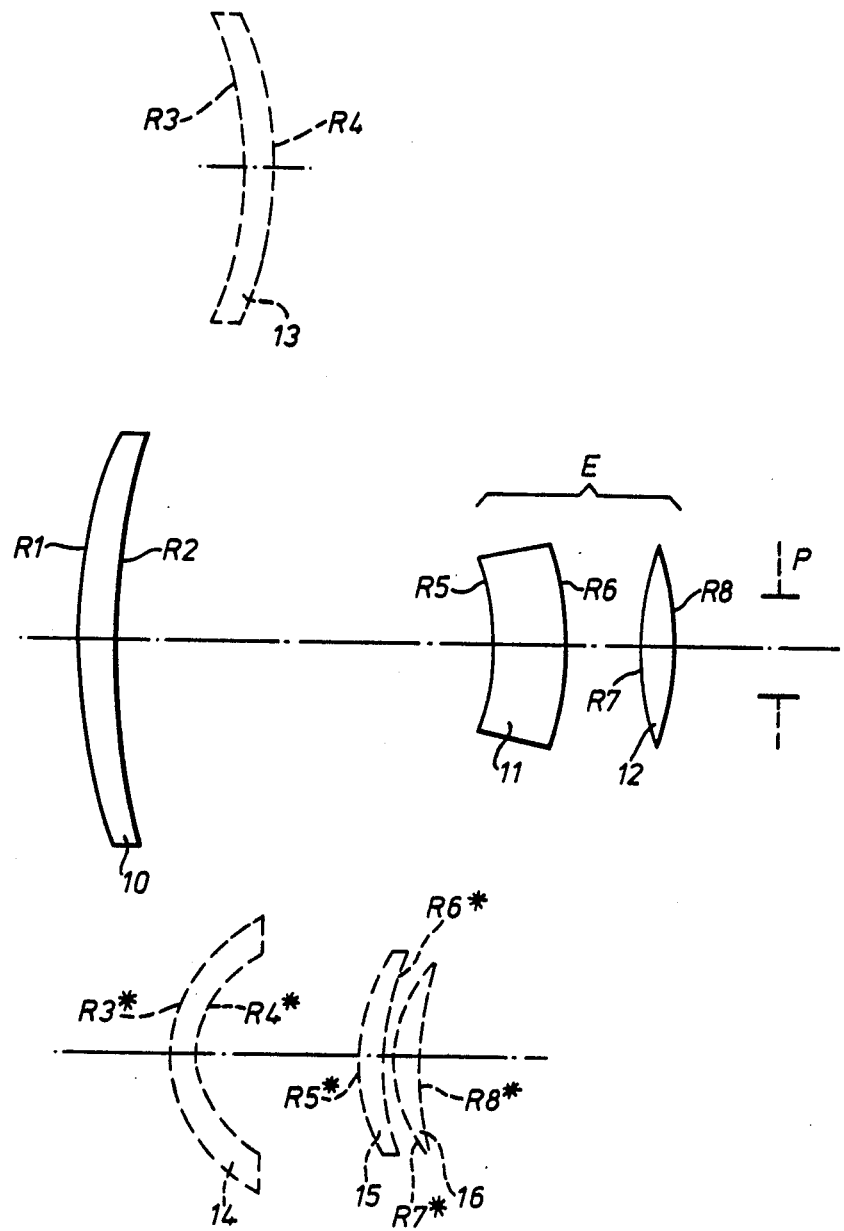

FIG. 3 illustrates another embodiment of afocal system having switchable lens elements which provide a dual magnification facility. It comprises a positive objective lens element 10 meniscus in form convex to the front basically as in the FIG. 2 embodiment except that in FIG. 3 the back concave surface R2 is spherical as distinct from aspheric. It also comprises an "eye-piece" system E consisting of elements 11 and 12 basically as described in relation to FIG. 2.

The switching elements (shown in broken line at off-axis positions) comprise on the one hand a single meniscus element 13 concave to the front which is interposed between the elements 10 and 11 to give a high magnification setting, and on the other hand an arrangement of three meniscus elements 14, 15 and 16 convex to the front which are interposed (instead of the element 13) between the elements 10 and 11 to give a low magnification setting.

A particular example of dual magnification afocal telescope in accordance with the FIG. 3 embodiment has numerical data as given below under Examples 3 and 3A. Each of these is designed to operate in the 8 to 13 micron spectral bandwidth. The elements 10, 11 and 12 are all of Germanium as are the elements 14, 15 and 16 (Example 3), while the element 13 (Example 3A) is of Zinc Selenide. In Example 3, which is a low magnification (×4) setting, the surfaces of the switching elements 14, 15 and 16 are indicated from front to back as R3* to R8*. In Example 3A, which is a high magnification (×13) setting, the front and back surfaces of the switching element 13 are indicated as R3 and R4 respectively.

EXAMPLE 3

| Element | Surface | Radius of Curvature | Axial Thickness/Separation |
|---|---|---|---|
| 10 | R1 | +232.320 | |
| | | | 11.092 |
| | R2 | +347.032 | |
| | | | 42.183 |
| 14 | R3* | +50.6698* | |
| | | | 7.747 |
| | R4* | +41.1863* | |
| | | | 135.700 |
| 15 | R5* | +319.835* | |
| | | | 4.572 |
| | R6* | +756.749* | |
| | | | 1.281 |
| 16 | R7* | +43.7905* | |
| | | | 4.572 |
| | R8* | +55.2969* | |
| | | | 43.607 |
| 11 | R5 | −27.1326 | |
| | | | d5 = 15.992 |
| | R6 | −37.4608 | |
| | | | 0.426 |
| 12 | R7 | +109.814 | |
| | | | 5.389 |
| | R8 | −417.132 | |

* = switching element
Diameter of element 10 = 153.0
Aperture stop: 118.9 behind R4*, diameter = 21.9
Ratio d5/R6 = −0.427
Overall length = 272.56
Maximum angular distortion 3.8%.

EXAMPLE 3A

| Element | Surface | Radius of Curvature | Axial Thickness/Separation |
|---|---|---|---|
| 10 | R1 | +232.320 | |
| | | | 11.092 |
| | R2 | +347.032 | |
| | | | 66.271 |
| 13 | R3 | −662.447* | |
| | | | 7.784 |
| | R4 | −923.191* | |
| | | | 165.608 |
| 11 | R5 | −27.1326 | |
| | | | d5 = 15.992 |
| | R6 | −37.4608 | |
| | | | 0.426 |
| 12 | R7 | +109.814 | |
| | | | 5.389 |
| | R8 | −417.132 | |

* = switching element
Diameter of element 10 = 153.0
Aperture stop 78.2 behind R4, diameter = 44.0
Ratio d5/R6 = −0.427
Overall length = 272.56
Maximum Angular Distortion 5.3%.

Figure 4:
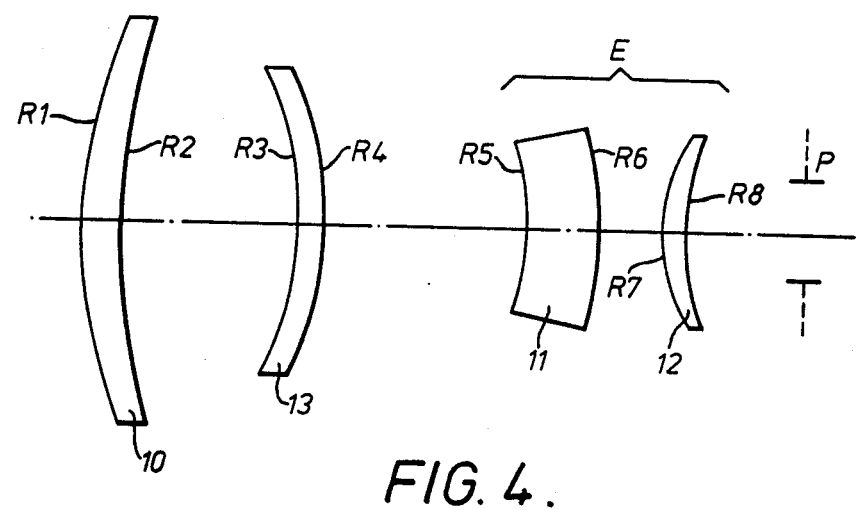
FIG. 4 is a schematic representation of a high magnification non-Gallilean afocal infra-red telescope for use in the system of FIG. 1.

FIG. 4 illustrates a further embodiment of afocal system which provides high magnification. It comprises a front objective lens element 10 which is basically the same as the element 10 in the previous embodiments being meniscus convex to the front. Behind the element 10 is a lens element 13 which is meniscus concave to the front and similar to the element 13 used in the high magnification setting in the FIG. 3 embodiment. Behind the element 13 is an "eye-piece" system E consisting of two elements 11 and 12 as in the previous embodiments except that for operation in the 3 to 5.5 micron bandwidth the back surface R8 of the back element 12 is concave as distinct from convex. The element 12 is thus shown in FIG. 4 as meniscus convex to the front for operation in that bandwidth. However, an embodiment like that of FIG. 4 but with a bi-convex back element 12 can be used for the 8 to 13 micron bandwidth.

Particular examples of high magnification afocal telescopes in accordance with the FIG. 4 embodiment have numerical details as given below under Examples 4 to 7. Example 4 is designed to operate in the 8 to 13 micron bandwidth (and has a bi-convex element 12), all the elements being of Germanium. Example 4 has a magnification of ×13. Examples 5 to 7 are designed to operate in the 3 to 5.5 micron bandwidth, (and have a meniscus element 12) and in each of these Examples the elements 10, 11 and 12 are of Silicon. The element 13 is of Magnesium Oxide in Example 5, of Strontium Titanate in Example 6, and of Sapphire in Example 7. Each of Examples 5 to 7 provides a magnification of ×15.

EXAMPLE 4

| Element | Surface | Radius of Curvature | Axial Thickness/Separation |
|---|---|---|---|
| 10 | R1 | +273.033 | |
| | | | 13.539 |
| | R2 | +393.043 | |
| | | | 127.252 |
| 13 | R3 | −209.721 | |
| | | | 6.499 |
| | R4 | −222.152 | |
| | | | 155.791 |
| 11 | R5 | −31.1832 | |
| | | | d5 = 16.079 |
| | R6 | −39.2747 | |
| | | | 21.585 |
| 12 | R7 | +126.376 | |
| | | | 5.416 |

-continued

| Element | Surface | Radius of Curvature | Axial Thickness/Separation |
|---|---|---|---|
| | R8 | −622.503 | |

Diameter of element 10 = 155.3
Aperture Stop: 69.8 behind R4, diameter = 36.6
Ratio d5/R6 = −0.409
Overall length = 346.16
Maximum angular distortion 2.5%

EXAMPLE 5

| Element | Surface | Radius of Curvature | Axial Thickness/Separation |
|---|---|---|---|
| 10 | R1 | +290.577 | |
| | | | 14.071 |
| | R2 | +436.038 | |
| | | | 45.357 |
| 13 | R3 | −610.068 | |
| | | | 10.318 |
| | R4 | −765.398 | |
| | | | 302.167 |
| 11 | R5 | −30.7293 | |
| | | | d5 = 15.447 |
| | R6 | −38.3368 | |
| | | | 14.586 |
| 12 | R7 | +56.7623 | |
| | | | 7.504 |
| | R8 | +144.445 | |

Diameter of element 10 = 158.0
Aperture Stop: 31.4 behind R4, diameter = 113.8
Ratio d5/R6 = −0.403
Overall length = 409.45
Maximum angular distortion 1.6%

EXAMPLE 6

| Element | Surface | Radius of Curvature | Axial Thickness/Separation |
|---|---|---|---|
| 10 | R1 | +274.979 | |
| | | | 13.341 |
| | R2 | +412.696 | |
| | | | 43.716 |
| 13 | R3 | −611.839 | |
| | | | 9.783 |
| | R4 | −692.004 | |
| | | | 287.429 |
| 11 | R5 | −27.6715 | |
| | | | d5 = 15.204 |
| | R6 | −35.7431 | |
| | | | 9.459 |
| 12 | R7 | +54.2955 | |
| | | | 7.115 |
| | R8 | +133.549 | |

Diameter of element 10 = 158.1
Aperture Stop: 35.5 behind R4, diameter = 111.9
Ratio d5/R6 = 0.425
Overall length = 386.05
Maximum angular distortion 2.1%

EXAMPLE 7

| Element | Surface | Radius of Curvature | Axial Thickness/Separation |
|---|---|---|---|
| 10 | R1 | +291.001 | |
| | | | 14.070 |
| | R2 | +434.772 | |
| | | | 44.743 |
| 13 | R3 | −634.923 | |
| | | | 10.318 |
| | R4 | −735.060 | |
| | | | 300.638 |
| 11 | R5 | −29.5445 | |
| | | | d5 = 16.072 |

-continued

| Element | Surface | Radius of Curvature | Axial Thickness/Separation |
|---|---|---|---|
| | R6 | −37.9293 | |
| | | | 10.240 |
| 12 | R7 | +57.0269 | |
| | | | 7.504 |
| | R8 | +141.010 | |

Diameter of element 10 = 157.9
Aperture Stop: 31.8 behind R4, diameter = 113.8
Ratio d5/R6 = −0.424
Overall length = 403.59
Maximum angular distortion 2.1%

The dimensional units in all the examples are millimeters but it will be understood that the values are relative and can be scaled accordingly. It will further be understood that the lens surfaces are spherical except where otherwise indicated; thus Examples 3, 3A and 4 to 7 are all-spherical arrangements while Examples 1 and 2 have a single aspheric (conic section) surface R2.

In all examples given above the diameter of the exit pupil is 10 mm with a 60 degree total field of view in the image space. The nominal exit pupil position is 27 mm behind the surface R8. If a much larger exit pupil is required, an extra negative power lens element, meniscus in shape with negative surface facing surface R7, could be placed near to the surface R7 to improve correction of spherical aberration in a manner well known per se. If desired, a field stop to define the exact field of view can be placed at the intermediate aerial image near to the surface R5.

All the examples given above are at or near diffraction limited resolution. The overall length quoted in the examples is the total axial distance between surfaces R1 and R8.

In the embodiments shown in FIGS. 2 to 4 the same references R5 to R8 are used to indicate the surfaces of the elements in the "eye-piece" system E. In each case the radius of curvature of the convex surface R6 is greater than that of the concave surface R5, i.e. R6 R5. The axial thickness d5 of the element 11, i.e. the axial distance between surfaces R5 and R6 is essentially thicker than that required for mechanical stability and preferably such that d5/R6 lies between −0.35 and −0.45 (R6 here being used to indicate radius of curvature) but the upper limit of this preferred ratio could be extended to the detriment of transmission.

It will be seen that in all the given examples designed to operate in the 8 to 13 micron bandwidth (i.e. Examples 1 to 4) the "eye-piece" elements 11 and 12 are of Germanium and the back thin lens element 12 is bi-convex. It will be understood, however, that a back element 12 of meniscus shape concave towards the exit pupil is also a possibility for the 8 to 13 micron bandwidth. In examples designed to operate in the 3 to 5.5 micron bandwidth (as Examples 5 to 7) the "eye-piece" elements 11 and 12 are preferably of Silicon and the back thin lens element 12 is meniscus in shape concave towards the exit pupil.

The lens element materials used in the given examples have refractive indices N and constringences or V values as follows:

| | N(10.6 microns) | V(8.5 to 12.5 microns) |
|---|---|---|
| Germanium | 4.00119 | 1004 |
| Zinc Selenide | 2.4034 | 56 |
| | N(3.5 microns) | V(3.0 to 4.5 microns) |
| Silicon | 3.4284 | 289 |

-continued

| | | |
|---|---|---|
| Magnesium Oxide (MgO) | 1.68055 | 18 |
| Strontium Titanate (SrTiO₃) | 2.20911 | 16 |
| Sapphire | 1.69535 | 11.5 |

As mentioned previously, a back element 12 of meniscus shape concave towards the exit pupil is a possibility for the 8 to 13 micron bandwidth. This is illustrated by Examples 8 to 9 below designed to operate in that bandwidth.

Figure 5:
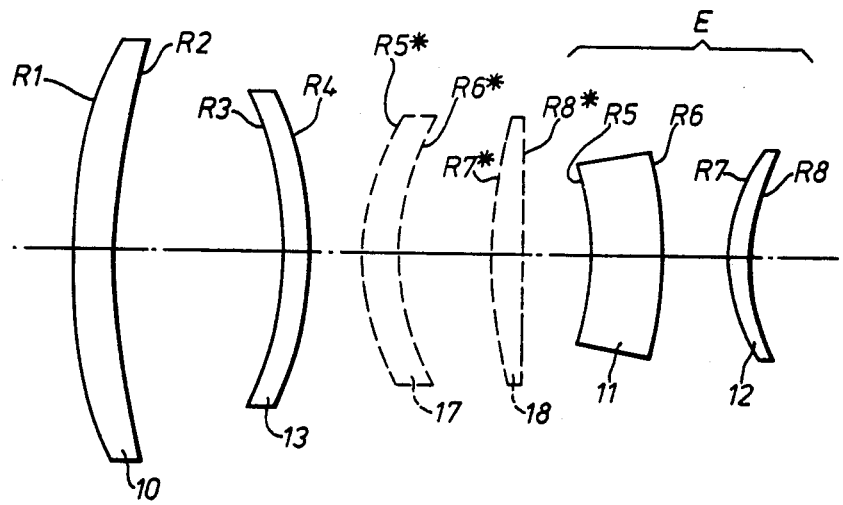

Example 8 has a basic configuration similar to that shown in FIG. 4 but is a dual magnification design having additional switching elements 17 and 18 shown in broken line in FIG. 5 which can be inserted between the elements 13 and 11 to give a low magnification setting. The element 17 is negative meniscus convex to the front, its surfaces being indicated as R5* and R6*, while the element 18 is positive convex-plano, its surfaces being indicated as R7* and R8*.

EXAMPLE 8

| Element | Surface | Radius of Curvature | Axial Thickness/Separation |
|---|---|---|---|
| 10 | R1 | +212.73 | |
| | R2 | +289.52 | 8.70 |
| | | | 80.60 |
| 13 | R3 | −135.00 | |
| | R4 | −141.01 | 6.50 |
| | | | 31.50 |
| 17 | R5* | +35.778* | |
| | R6* | +28.461* | 5.02* |
| | | | 80.48* |
| 18 | R7* | +138.09* | |
| | R8* | PLANO* | 6.50* |
| | | | 66.20 |
| 11 | R5 | −38.599 | |
| | R6 | −42.271 | d5 = 13.00 |
| | | | 6.00 |
| 12 | R7 | +47.189 | |
| | R8 | +66.390 | 5.20 |

* = switching element whose insertion gives low magnification Diameter of element 10 = 105.0
Aperture Stop = 30.0 behind R8, diameter = 10.3
Ratio d5/R6 = −0.308
Overall length = 309.7
Maximum Angular Distortion = 3.0%
Magnification:- High × 10; Low × 3.35
Nominal Exit Pupil Diameter = 10.3mm
Total Exit Field of View = 33.7 degrees
Nominal Exit Pupil Distance behind R8 = 30.0mm It will be noted that the absolute ratio d5/R6 is less in Example 8 than in the other examples. This is because Example 8 has a lower exit field of view.

Figure 6:
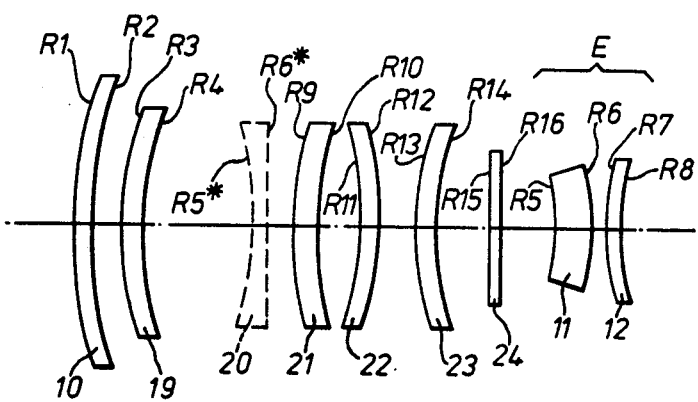

Example 9 is also a dual magnification design and has a basic configuration as shown in FIG. 6. It comprises a front element 10 as previously described and back "eyepiece" elements 11 and 12 also as previously described. Between the elements 10 and 11 there are a negative meniscus element 19 convex to the front, a switchable element 20 shown in broken line, a positive meniscus element 21 convex to the front, a negative meniscus element 22 concave to the front, a positive meniscus element 23 convex to the front, and a block 24 having planar surfaces. The switchable element 20 is negative concave-plano and is disposed with its concave surface to the front at the high magnification setting. At the low magnification setting it is turned round so that its concave surface faces to the back. The block 24 is of rocksalt and effects correction of chromatic aberration. The surfaces of element 10 are indicated as R1 and R2, and the surfaces of elements 11 and 12 are indicated as R5 to R8 as previously. The surfaces of element 19 are indicated as R3 and R4 and those of elements 21 to 23 and block 24 as R9 to R16. The surfaces of the switching element 20 are indicated as R5* and R6*.

EXAMPLE 9

| Element | Surface | Radius of Curvature | Axial Thickness/Separation |
|---|---|---|---|
| 10 | R1 | +354.323 | |
| | R2 | +591.206 | 10.940 |
| | | | 3.010 |
| 19 | R3 | +250.743 | |
| | R4 | +222.397 | 8.850 |
| | | | 166.350* |
| 20 | R5* | −391.172* | |
| | R6* | PLANO* | 7.290* |
| | | | 25.400* |
| 21 | R9 | +323.604 | |
| | R10 | +2244.61 | 10.680 |
| | | | 10.420 |
| 22 | R11 | −256.105 | |
| | R12 | −313.762 | 9.370 |
| | | | 36.210 |
| 23 | R13 | +104.433 | |
| | R14 | +126.246 | 10.680 |
| | | | 68.510 |
| 24 | R15 | PLANO | |
| | R16 | PLANO | 13.020 |
| | | | 23.800 |
| 11 | R5 | −43.585 | |
| | R6 | −52.851 | d5 = 22.930 |
| | | | 0.260 |
| 12 | R7 | +90.143 | |
| | R8 | +146.991 | 8.850 |

* = switching element which is turned round so that air gaps in front and behind change to 26.550 and 165.200 respectively to give low magnification.
Diameter of Element 10 = 135.0
Aperture Stop = 24.1 behind R4, diameter = 105.4 at highmagnification setting. 151.2 behind R6*,diameter = 97.1 at low magnification setting.
Ratio d5/R6 = −0.434
Overall length = 436.57
Maximum Angular Distortion = 3.7%
Magnification:- High × 6; Low × 2.2
Nominal Exit Pupil Diameter = 20.0mm at high magnification = 29.75mm at low magnification
Total Exit Field of View = 64.7 degrees
Nominal Exit Pupil Distance behind R8 = 40.95mm Although shown in "straight through" form in FIG. 6, Example 9 may in practice have a fold behind the element 19 achieved by the inclusion of a mirror in a manner well known per se. Such fold can effectively provide space which facilitates turning round of the switching element 20 between the high and low magnification settings by suitable mechanical arrangements.

All the lens elements in Examples 8 and 9 are of Germanium having refractive index N and V values as given previously. The rock-salt block 24 in Example 9 has a refractive index N of 1.49042 at 10.6 microns and a V value of 18.35 at 8.5 to 12.5 microns.

It will be appreciated that the "eye-piece" system described above specifically in association with particular objective lens systems by way of example could be employed with other types of objective lens systems including zoom systems.

Figure 7:
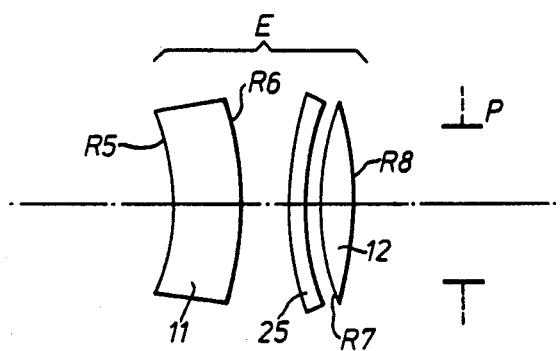
FIG. 7 illustrates a modication.

The previously mentioned possibility of including an extra negative power lens element, meniscus in shape with negative surface facing surface R7, in the "eye-piece" system to achieve a much larger exit pupil is illustrated in FIG. 7 in which the extra element is indicated at 25.

I claim:

1. An "eye-piece" system for use in a non-Gallilean afocal infra-red optical system, the "eye-piece" system comprising two lens elements, the back element of the two being positive in power and having a back surface which is either convex or concave and a front surface which is convex, and the front element of the two being of meniscus form having a back surface which is convex and a front surface which is concave with the radius of curvature of the convex back surface greater than that of the concave front surface but the thickness of the front element being such as to give it positive power.

2. An "eye-piece" system according to claim 1 wherein the two elements are of the same material.

3. An "eye-piece" system according to claim 2 designed to cover the 8 to 13 micron waveband wherein the two elements are of Germanium.

4. An "eye-piece" system according to claim 2 designed to cover the 3 to 5.5 micron waveband wherein the two elements are of Silicon.

5. An "eye-piece" system according to claim 1 wherein the thickness of the front element is between 0.35 and 0.45 of the absolute value of radius of curvature of the element's back surface.

6. An "eye-piece" system according to claim 1 including an extra negative power lens element meniscus in shape with a concave back surface between said two elements and close to the back element.

7. A non-Gallilean afocal infra-red optical system comprising an "eye-piece" system according to claim 1 in combination with an objective lens system.

8. An optical system according to claim 7 including switchable lens elements.

9. A infra-red optical system comprising an objective lens system for producing a real image from infra-red radiation from a distant scene or object, an "eye-piece" system according to claim 1 positioned to receive infra-red radiation from that image and to provide a collimated magnified view of the scene or object at a real exit pupil, and scanning means operative at that exit pupil to scan the collimated magnified view via imaging means across infra-red detector means.

10. An "eye-piece" system for use in a non-Gallilean afocal infra-red optical system designed to operate in the 8 to 13 micron bandwidth, the "eye-piece" system consisting of a front element which is meniscus in form and has a convex back surface whose radius of curvature is greater than that of its concave front surface but which has a thickness such as to give the element positive power, and a back element of positive power which is bi-convex.

11. A non-Gallilean afocal infra-red telescope designed to operate in the 8 to 13 micron bandwidth comprising an "eye-piece" system according to claim 10 in combination with an objective lens consisting of a positive meniscus element convex to the front and having an aspheric back concave surface.

12. A non-Gallilean afocal infra-red telescope designed to operate in the 8 to 13 micron bandwidth comprising an "eye-piece" system according to claim 10 in combination with an objective lens system consisting of a front positive meniscus element convex to the front and a negative meniscus element concave to the front.

13. A dual magnification non-Gallilean afocal infra-red telescope designed to operate in the 8 to 13 micron bandwidth comprising an "eye-piece" system according to claim 10 in combination with an objective lens system consisting of a front positive meniscus element convex to the front and including as alternative switchable elements (i) a negative meniscus element concave to the front and (ii) a negative meniscus element convex to the front and two positive meniscus elements convex to the front.

14. An "eye-piece" system for use in a non-Gallilean afocal infra-red optical system designed to operate in the 8 to 13 micron bandwidth, the "eye-piece" system consisting of a front element which is meniscus in form and has a convex back surface whose radius of curvature is greater than that of its concave front surface but which has a thickness such as to give the element positive power, and a back element of positive power which is meniscus in form concave towards the back.

15. A dual magnification non-Gallilean afocal infra-red telescope designed to operate in the 8 to 13 micron bandwidth comprising an "eye-piece" system according to claim 14 in combination with an objective lens system consisting of a front positive meniscus element convex to the front, a negative meniscus element concave to the front and switching elements insertable between said "eye-piece" system and said negative meniscus element and consisting of a negative meniscus element convex to the front and a positive convex-plano element.

16. A dual magnification non-Gallilean afocal infra-red telescope designed to operate in the 8 to 13 micron bandwidth comprising an "eye-piece" system according to claim 14 in combination with an objective lens system consisting of from front to back a positive meniscus element convex to the front, a negative meniscus element convex to the front, a switchable negative concave-plano element which at one magnification setting has its concave surface facing to the front and in the other magnification setting is turned round to have its concave surface facing to the back, a positive meniscus element convex to the front, a negative meniscus element concave to the front, a positive meniscus element convex to the front and a chromatic aberration correcting block with planar surfaces.

17. An "eye-piece" system for use in a non-Gallilean afocal infra-red optical system designed to operate in the 3 to 5.5 micron bandwidth, the "eye-piece" system consisting of a front element which is meniscus in form and has a convex back surface whose radius of curvature is greater than that of its concave front surface but which has a thickness such as to give the element positive power, and a back element of positive power which is meniscus in form concave towards the back.

18. A non-Gallilean afocal infra-red telescope designed to operate in the 3 to 5.5 micron bandwidth comprising an "eye-piece" system according to claim 17 in combination with an objective lens system consisting of a front positive meniscus element convex to the front and a negative meniscus element concave to the front.

* * * * *

UNITED STATES PATENT AND TRADEMARK OFFICE
CERTIFICATE OF CORRECTION

PATENT NO. : 4,199,217
DATED : April 22, 1980
INVENTOR(S) : Philip J. Rogers

It is certified that error appears in the above-identified patent and that said Letters Patent are hereby corrected as shown below:

On the title page add item [30] as follows:

-- Foreign Application Priority Data

June 1, 1977 [GB]   United Kingdom   23075/77 --.

Col. 4, line 40, under column "Axial Thickness/Separation"

please insert --8.084--

Signed and Sealed this

Seventeenth Day of January 1984

[SEAL]

Attest:

GERALD J. MOSSINGHOFF

Attesting Officer

Commissioner of Patents and Trademarks